(12) United States Patent
Popescu et al.

(10) Patent No.: US 12,038,505 B2
(45) Date of Patent: Jul. 16, 2024

(54) LIDAR UNIT WITH MOUNTING ELEMENT FOR ATTACHING TRANSMITTER MODULE AND RECEIVER MODULE

(71) Applicant: Valeo Schalter und Sensoren GmbH, Bietigheim-Bissingen (DE)

(72) Inventors: Sorin Popescu, Bietigheim-Bissingen (DE); Peter Horvath, Bietigheim-Bissingen (DE); Thomas Schuler, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 587 days.

(21) Appl. No.: 16/632,995

(22) PCT Filed: Jul. 23, 2018

(86) PCT No.: PCT/EP2018/069932
§ 371 (c)(1),
(2) Date: Jan. 22, 2020

(87) PCT Pub. No.: WO2019/020570
PCT Pub. Date: Jan. 31, 2019

(65) Prior Publication Data
US 2020/0217956 A1     Jul. 9, 2020

(30) Foreign Application Priority Data
Jul. 24, 2017   (DE) ............... 10 2017 116 595.9

(51) Int. Cl.
*G01S 17/08*   (2006.01)
*G01S 7/481*   (2006.01)
(Continued)

(52) U.S. Cl.
CPC ............ *G01S 17/08* (2013.01); *G01S 7/4813* (2013.01); *G01S 7/4972* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,706,140 A |   | 1/1998 | Nishino et al. |
| 5,959,734 A | * | 9/1999 | Tanaka .................. G01S 7/4817 356/614 |

(Continued)

FOREIGN PATENT DOCUMENTS

| | | |
|---|---|---|
| CN | 103430042 A | 12/2013 |
| CN | 104285160 A | 1/2015 |

(Continued)

OTHER PUBLICATIONS

International Search Report and Written Opinion corresponding to International Application No. PCT/EP2018/069932, mailed Oct. 29, 2018 (13 pages).

(Continued)

*Primary Examiner* — Aniss Chad
*Assistant Examiner* — Mahmoud M Kazimi
(74) *Attorney, Agent, or Firm* — Osha Bergman Watanabe & Burton LLP

(57) ABSTRACT

The invention concerns a lidar unit (10), in particular a laser scanner, for laser-based distance measurement for a vehicle, with a transmitter module (12) that is designed to emit a laser beam, and a receiver module (14) that is designed to receive a reflection of the emitted laser beam, wherein the lidar unit (10) has a mounting element (16) for attaching the transmitter module (12) and the receiver module (14), the mounting element (16) and the transmitter module (12)

(Continued)

Figure 1:
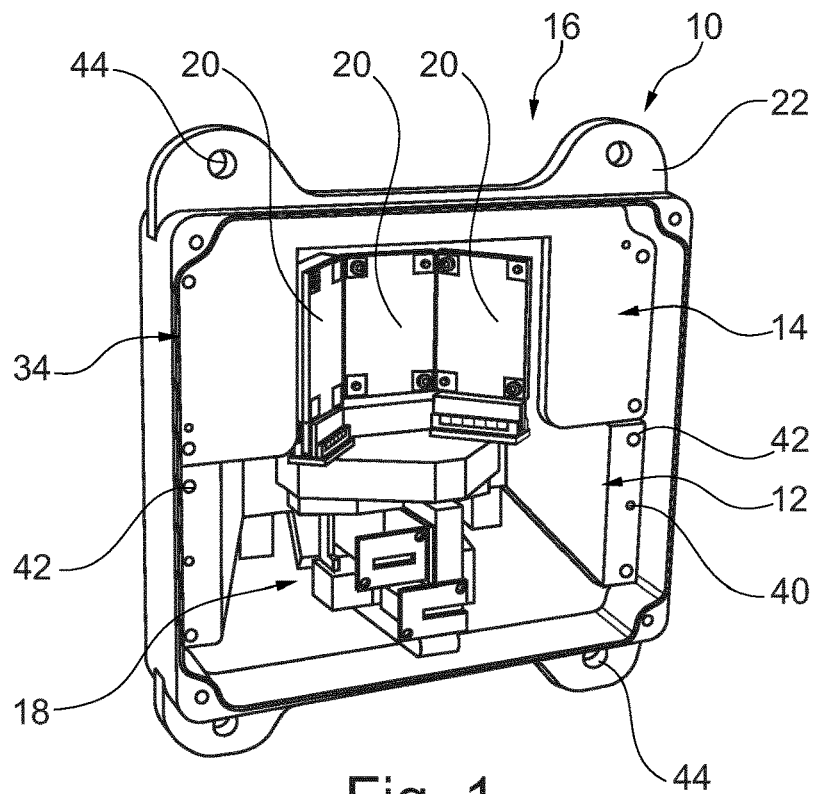

comprise corresponding first stop surfaces (26, 28) for aligning the transmitter module (12) on the mounting element (16), the mounting element (16) and the receiver module (14) comprise corresponding second stop surfaces (32, 34) for aligning the receiver module (14) on the mounting element (16), the transmitter module (12) is pre-calibrated in relation to its first stop surface (26) and the receiver module (14) is pre-calibrated in relation its second stop surface (32). The invention also concerns a method for the assembly of a lidar unit (10), in particular a laser scanner, for laser-based distance measurement for a vehicle.

12 Claims, 2 Drawing Sheets

(51) Int. Cl.
*G01S 7/497* (2006.01)
*G01S 17/42* (2006.01)
*G01S 17/931* (2020.01)

(56) References Cited

U.S. PATENT DOCUMENTS

| | | |
|---|---|---|
| 2013/0135604 A1 | 5/2013 | Gogolla et al. |
| 2014/0340487 A1* | 11/2014 | Gilliland ............... G01S 17/931 348/48 |
| 2014/0347650 A1* | 11/2014 | Bosch .................... G01S 17/08 356/5.01 |
| 2015/0088448 A1* | 3/2015 | Du ........................ G01S 7/4911 702/97 |

FOREIGN PATENT DOCUMENTS

| | | |
|---|---|---|
| DE | 69423020 T2 | 9/2000 |
| DE | 10244640 A1 | 4/2004 |
| EP | 2795362 B1 | 3/2016 |
| EP | 3159712 A1 | 4/2017 |
| JP | H10-093116 A | 4/1998 |
| JP | 2000-108825 A | 4/2000 |
| JP | 2000-121725 A | 4/2000 |
| JP | 2004053305 A | 2/2004 |
| KR | 10-2015-0129183 A | 11/2015 |

OTHER PUBLICATIONS

German Search Report issued in corresponding German Application No. 10 2017 116 595.9, dated May 8, 2018 (10 pages).

Notice of Preliminary Rejection in corresponding Korean Application No. 2020-7002153, dated May 17, 2021 (18 pages).

Office Action issued in corresponding Japanese Application No. 2020-503728, Dated Oct. 30, 2020 (12 pages with Translation).

Office Action Issued in corresponding CN Application No. 201880049015.3; dated Jul. 27, 2023. (13 Pages with English Translation).

Zhongliang Ma et al. "Design of an automatic collimation system for transmissometer measurement optical path based on beam scanning", Microcomputer and Applications, Issue 15, pp. 42-47, Aug. 10, 2016 (4 Pages).

Menglin Li et al. "Dual-channel three-dimensional imaging laser radar technology", Surveying and Mapping Science, vol. 38, Issue 03, pp. 49-51, May 20, 2013 (3 Pages).

* cited by examiner

LIDAR UNIT WITH MOUNTING ELEMENT FOR ATTACHING TRANSMITTER MODULE AND RECEIVER MODULE

The present invention relates to a lidar unit, in particular a laser scanner, for laser-based distance measurement for a vehicle with a transmitter module which is designed to emit a laser beam, and a receiver module, which is designed to receive a reflection of the emitted laser beam.

The present invention also relates to a method for mounting a lidar unit, in particular a laser scanner, for laser-based distance measurement for a vehicle.

Lidar units are often used as environmental sensors for driving assistance systems in different vehicles. The lidar units are thus used to detect objects and persons in the vicinity of the vehicle in order to increase the safety of the vehicle and, for example, of other road users in the vicinity.

The term lidar comes from English and is an abbreviation for "light detection and ranging". Lidar is a method related to radar, wherein with lidar laser beams are used instead of the radio waves used in radar. Lidar is suitable for speed measurement in addition to distance measurement. For this purpose, reflections of the laser beam at the object are evaluated. In both cases, the transition times of a laser beam to the object and back are determined to determine the distance to the object.

In addition to the transition time, an intensity of the reflected laser beam can also be detected. By this means, reflection properties of the object at which the laser beam is reflected can be determined to detect the object with more details.

In a laser scanner, a linear or grid-like scanning of an environment with a laser beam takes place. This allows the environment to be reliably scanned to detect objects. For this purpose, the laser beam is suitably deflected in order to be able to completely scan a detection area, also called a field of view.

A laser scanner that also detects the intensity of the reflected signal in addition to the distances is generally called an imaging laser scanner. The recording of the intensity values of the laser light reflected from the recorded surfaces takes place in today's imaging laser scanners in 16-bit grayscales, for example. As a result, the imaging laser scanner provides an image of the environment similar to that of a black-and-white photo.

In current lidar units, the transmission and reception beams are adjusted relative to each other to adjust parallelism or an intersection of the rays with each other. High accuracy is required during this to achieve angular resolutions in a range of less than one degree, typically about 0.1 degrees. This makes the adjustment time-consuming and costly.

In this context, an adjustment method and an associated construction concept for an optoelectronic rangefinder are known from EP 2 795 362 B1. The rangefinder has an assembly with a radiation source for emitting an optical transmission radiation, a detector for receiving an optical reception radiation and a printed circuit board that are arranged in a rigid spatial relationship to each other, as well as an optics carrier with transmission optics and reception optics. A transmission direction is defined by the radiation source as well as the transmission optics and a reception direction is defined by the detector and the reception optics. Furthermore, the transmission optics and the reception optics have different focal lengths. The adjustment method establishes an intended orientation of the transmission direction relative to the reception direction. In this case, an adjustment is carried out by a displacement of the entire assembly relative to the optics carrier, wherein by a leverage effect of the different focal lengths the displacement causes respective differently-sized displacement-related directional angle changes of the transmission direction and the reception direction, whereby the orientation of the transmission direction relative to the reception direction is varied.

Based on the aforementioned prior art, the invention is therefore based on the object of specifying a lidar unit, in particular a laser scanner, for laser-based distance measurement for a vehicle as well as a method for the assembly of a lidar unit, in particular of a laser scanner, for laser-based distance measurement for a vehicle that allows easy assembly and provision of the lidar unit to achieve high accuracy when detecting an environment.

According to the invention, the object is achieved by the features of the independent claims. Advantageous embodiments of the invention are specified in the subordinate claims.

Thus, according to the invention, a lidar unit, in particular a laser scanner, for laser-based distance measurement for a vehicle is specified with a transmitter module, which is designed to emit a laser beam, and a receiver module, which is designed to receive a reflection of the emitted laser beam, wherein the lidar unit has a mounting element for attaching the transmitter module and the receiver module, the mounting element and the transmitter module comprise corresponding first stop surfaces for orientation of the transmitter module relative to the mounting element, the mounting element and the receiver module comprise corresponding second stop surfaces for orienting the receiver module relative to the mounting element, the transmitter module is pre-calibrated relative to its first stop surface and the receiver module is pre-calibrated relative to its second stop surface.

According to the invention a method is also specified for mounting a lidar unit, in particular a laser scanner, for laser-based distance measurement for a vehicle, including the following steps; provision of a transmitter module that is designed to emit a laser beam, provision of a receiver module designed to receive a reflection of the emitted laser beam, provision of a mounting element for attaching the transmitter module and the receiver module, attaching the transmitter module to the mounting element, wherein corresponding first stop surfaces of the transmitter module and the mounting element are brought into contact with each other, attaching the receiver module to the mounting element, wherein corresponding second stop surfaces of the receiver module and the mounting element are brought into contact with each other, pre-calibration of the transmitter module relative to the first stop surface and pre-calibration of the receiver module relative to the second stop surface.

The basic idea of the present invention is therefore to make a calibration of the transmitter module and receiver module relative to each other superfluous by mounting the two modules on the respective stop surfaces. The alignment of the corresponding first or second stop surfaces automatically results in an adjustment of the transmitter module and receiver module relative to each other in the mounted state. Errors in the adjustment are only in the range of manufacturing tolerances in the production of the mounting element, the transmitter module and the receiver module. In particular, a tolerance in the production of the first or second stop surfaces is important, since the alignment of the transmitter module and the receiver module relative to each other is carried out by means of the first and second stop surfaces. The alignment of the first and second stop surfaces thus defines a reference position in which calibration of the lidar unit in the mounted state can be omitted based on the pre-calibration of the transmitter module and the receiver module.

Pre-calibration is particularly important for the transmitter module in order to achieve correct sampling of a field of view of the lidar unit. The receiver module is usually less sensitive to angle, so that the reception of the reflections of the laser beam emitted by the transmitter module requires a less precise alignment of the receiver module.

The corresponding first and second stop surfaces each comprise a pair of stop surfaces, one of which is formed on the mounting element and the other correspondingly on the transmitter module or the receiver module.

In an advantageous embodiment of the invention, the first stop surfaces and/or the second stop surfaces are each implemented as substantially flat stop surfaces. The first stop surfaces and/or the second stop surfaces can thus be implemented as flat flanges, for example. In principle, the flat stop surface can also be defined by a number of supporting points that span the plane.

In an advantageous embodiment of the invention, the first stop surface and the second stop surface of the mounting element are substantially implemented in a common plane. Thus, a continuous, common stop surface is formed on the mounting element, which includes the first and the second stop surface. This allows the two modules to be aligned to this common stop surface. The alignment of the two modules relative to the mounting element can thus be carried out in a simple way.

In an advantageous embodiment of the invention, the first stop surfaces and/or the second stop surfaces each have multiple corresponding surface sections, which are arranged at an angle to each other or in multiple parallel planes. The first or second stop surfaces can thus have an arbitrary corresponding shape. For example, the stop surfaces may have multiple parallel planes. A corresponding design of the first or second stop surfaces can be used, for example, to not only cause an alignment in a plane, but also to automatically cause positioning of the transmitter module and the receiver module in the plane during assembly. For example, the first and second stop surfaces may be designed or arranged so that they automatically cause an alignment in several spatial axes, preferably in all spatial axes. Particularly preferably, the first and second stop surfaces are designed or arranged so that they additionally cause a rotary alignment around the spatial axes. The transmitter module and the receiver module can thus be aligned in up to six degrees of freedom.

Alternatively or additionally, the first stop surfaces and/or the second stop surfaces may be arranged in two parallel planes on the mounting element. An intermediate transition is preferably designed for the alignment of the transmitter module and the receiver module.

In an advantageous embodiment of the invention, the mounting element is designed as a flat mounting frame, and the transmitter module and the receiver module are arranged on the mounting frame. The mounting frame can be provided as a compact component to provide the lidar unit with a small size. The flat mounting frame has a low depth compared to the transmitter module and/or the receiver module.

In an advantageous embodiment of the invention, the mounting frame has a peripheral frame and an insertion opening for receiving the transmitter module and/or the receiver module. The transmitter module and/or the receiver module can therefore be positioned and held within the insertion opening. The mounting frame can be provided as a compact component to provide the lidar unit as a whole with a small size. By inserting the transmitter module and/or the receiver module into the insertion opening, a simple and stable connection to the mounting frame is made possible and the alignment of the transmitter module and/or the receiver module on the mounting frame is facilitated.

In an advantageous embodiment of the invention, the first stop surfaces and/or the second stop surfaces have corresponding positioning elements for the alignment of the transmitter module and/or the receiver module on the mounting element. Due to the corresponding positioning elements, in addition to the orientation in a plane defined by the stop surfaces, the transmitter module and/or the receiver module can be reliably and reproducibly fixed to the mounting element in further degrees of freedom. Various embodiments of the corresponding positioning elements are possible.

In an advantageous embodiment of the invention, the corresponding positioning elements of the first stop surfaces and/or the second stop surfaces have corresponding positioning pins and positioning receptacles. The positioning pins and positioning receptacles have corresponding dimensions or circumferential shapes that allow an exact alignment of the transmitter module and/or the receiver module on the mounting element. In addition, the positioning pins and/or positioning receptacles may be designed to facilitate or automatically carry out alignment of the transmitter module and/or receiver module on the mounting element. For this purpose, the positioning pins may have a conical shape, for example, and/or the positioning receptacles are implemented with a funnel shape. Accordingly, the transmitter module and/or the receiver module are automatically guided to the desired position during attachment to the mounting element.

In an advantageous embodiment of the invention, the first stop surface of the transmitter module is formed by first edge areas of the transmitter module. The formation of the first stop surface in the edge areas enables reliable positioning and support, especially if there is the greatest possible distance between the individual edge areas. Also, a functional unit of the transmitter module can be formed without restrictions in a central area thereof.

In an advantageous embodiment of the invention, the second stop surface of the receiver module is formed by second edge areas of the receiver module. The formation of the first stop surface in the edge areas enables reliable positioning and support, especially if there is the greatest possible distance between the individual edge areas. Also, a functional unit of the receiver module can be formed without restrictions in a centre range thereof.

In an advantageous embodiment of the invention, the mounting element has a number of mounting passthroughs for attaching the lidar unit to the vehicle. Due to the mounting passthroughs, the lidar unit can be easily mounted on the vehicle by means of the mounting element. Additional configurations of the transmitter module or the receiver module for mounting on the vehicle are not required. The mounting passthroughs can be used, for example, to pass through pins, bolts, screws, clip connectors or other mounting devices to reliably mount the lidar unit on the vehicle.

In an advantageous embodiment of the invention, the lidar unit comprises fasteners for fastening the transmitter module and/or the receiver module. Due to the fasteners, the transmitter module and/or the receiver module can be fixed after positioning for further use. The fasteners may include, for example, pins, bolts, screws, clip connectors or others, which are guided through suitable openings of the mounting element and the transmitter module and/or the receiver module. Alternatively, the fasteners may be implemented integrally with the mounting element, the transmitter module and/or the receiver module to facilitate the fastening.

The invention is explained in more detail below with reference to the accompanying drawing and based on preferred embodiments. The presented features can represent an aspect of the invention both individually and in combination. Features of different embodiments can be transferred from one embodiment to another.

Figure 2:
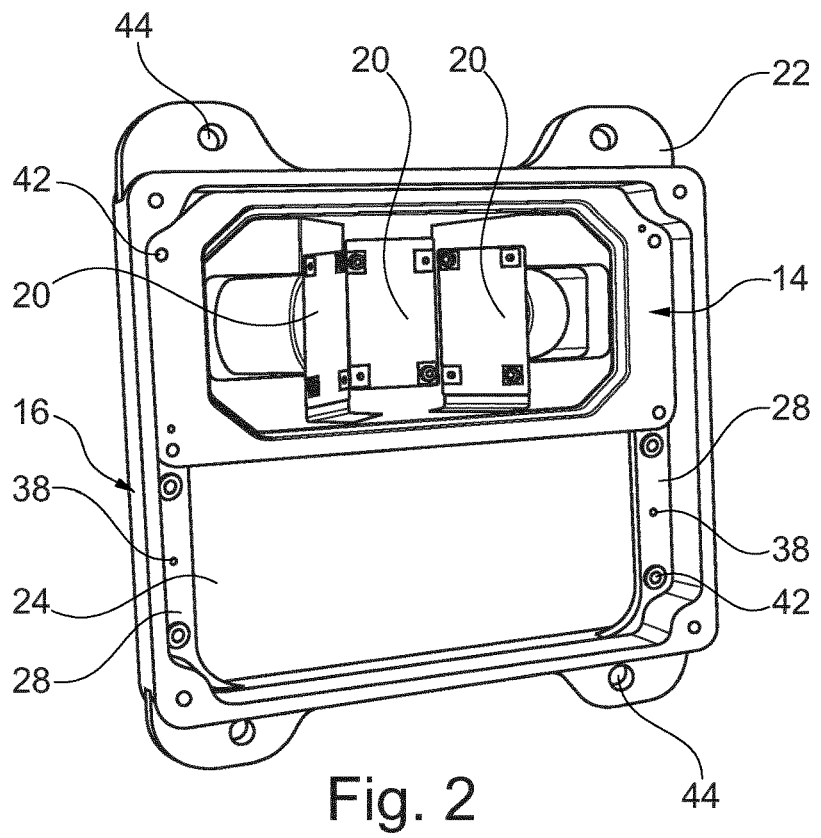
Figure 3:
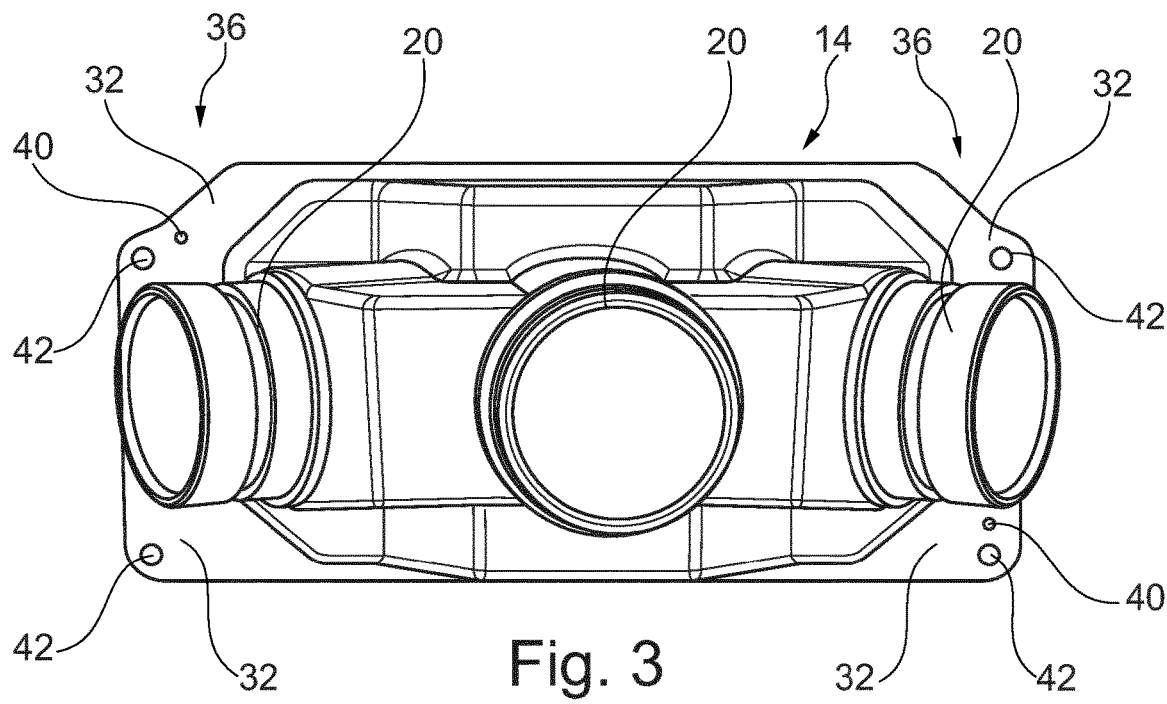
Figure 4:
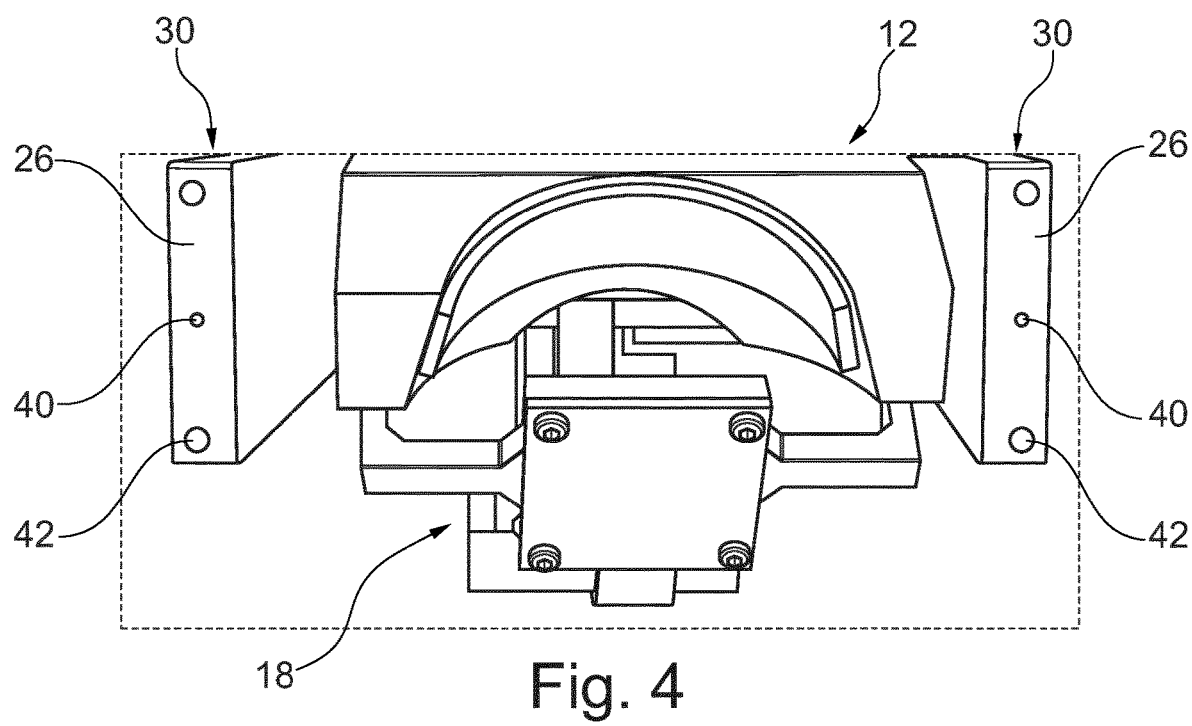

In the figures:

FIG. 1 shows a perspective representation in a rear view of a lidar unit with a transmitter module and a receiver module, which are attached to a mounting element, according to a first preferred embodiment, FIG. 2 shows a perspective representation in a rear view of the lidar unit from FIG. 1 with the receiver module attached to the mounting element, wherein the transmitter module was not represented, in accordance with the first embodiment, FIG. 3 shows a perspective representation in a front view of the receiver module of the lidar unit from FIG. 1 in accordance with the first embodiment, and FIG. 4 shows a perspective representation in a rear view of the transmitter module of the lidar unit from FIG. 1 in accordance with the first embodiment.

FIGS. 1 to 4 concern a lidar unit 10 according to a first, preferred embodiment.

The lidar unit 10 is designed here as a laser scanner for laser-based distance measurement for a vehicle. The laser scanner 10 comprises a transmitter module 12, which is designed to emit a laser beam, and a receiver module 14, which is designed to receive a reflection of the emitted laser beam. As is shown in FIG. 1, the transmitter module 12 and the receiver module 14 are attached to a mounting element 16.

The transmitter module 12 includes a device 18 for generating and deflecting a laser beam, as can be seen for example in FIG. 4. The receiver module 14 comprises here three single receivers 20 for receiving reflections of the emitted laser beam. The three receivers 20 are arranged in a horizontal plane to detect as wide a horizontal sampling area as possible in accordance with the possible deflection of the laser beam by the device 18 for the generation and deflection of a laser beam.

The mounting element 16 is designed here as a flat mounting frame on which the transmitter module 12 and the receiver module 14 are arranged. The flat mounting frame 16 has a low depth compared to the transmitter module 12 and the receiver module 14. The mounting frame 16 comprises a peripheral frame 22 and an insertion opening 24, in which the transmitter module 12 and the receiver module 14 are accepted. The transmitter module 12 and the receiver module 14 are thus positioned and held within the insertion opening 24 as explained in detail below.

For attaching the transmitter module 12 to the mounting element 16, the transmitter module 12 and the mounting frame 16 comprise corresponding first stop surfaces 26, 28 for the alignment of the transmitter module 12 on the mounting frame 16. The first stop surface 26 of the transmitter module 12 is shown in the representations in FIGS. 1 and 4 only from behind and is formed by first edge areas 30 of the transmitter module 12. The first stop surface 28 of the mounting element 16 can be seen in FIG. 2. The first stop surfaces 26, 28 are implemented here as essentially flat stop surfaces 26, 28.

For attaching the receiver module 14 to the mounting frame 16, the receiver module 14 and the mounting frame 16 comprise corresponding second stop surfaces 32, 34 for the alignment of the receiver module 14 on the mounting frame 16. The second stop surface 32 of the receiver module 14 is shown in the representation in FIG. 3 and is formed by second edge areas 36 of the receiver module 14. The second stop surface 34 of the mounting frame 16 is not visible in FIGS. 1 and 2 and is obscured by the receiver module 14. The second stop surfaces 32, 34 are implemented here as essentially flat stop surfaces 32, 34.

As best shown in FIG. 2, the first stop surface 28 and the second stop surface 34 of the mounting frame 16 are essentially in a common plane, which includes the first and the second stop surfaces 28, 34 of the mounting frame 16.

The first and second stop surfaces 26, 28, 32, 34 have corresponding positioning elements 38, 40 for the alignment of the transmitter module 12 and the receiver module 14 on the mounting frame 16. The positioning elements 38, 40 include positioning receptacles 38, which are formed on the first and second stop surfaces 28, 34 of the mounting frame 16, and positioning pins 40, which are formed at the first stop surfaces 26 of the transmitter module 12 and the second stop surfaces 32 of the receiver module 14. The positioning elements 38, 40 have corresponding dimensions and circumferential shapes, which cause an exact alignment of the transmitter module 12 and/or the receiver module 14 on the mounting frame 16.

Openings 42 are formed in the first and second stop surfaces 26, 28, 32, 34 of the transmitter module 12, the receiver module 14 and the mounting frame 16, through which fasteners (not shown here) for fixing the transmitter module 12 and the receiver module 14 to the mounting frame 16 can be passed. The fasteners may include, for example, pins, bolts, screws, clip connectors or others, which can be passed through the openings 42 of the mounting frame 16 and the transmitter module 12 or the receiver module 14.

The transmitter module 12 is pre-calibrated in relation to its first stop surface 26. The receiver module 14 is also pre-calibrated in relation to its second stop surface 32. Thus, the alignment of the corresponding first and second stop surfaces 26, 28, 32, 34 automatically results from the adjustment of the transmitter module 12 and the receiver module 14 relative to each other in the mounted state. The alignment of the first and second stop surfaces 26, 28, 32, 34 thus defines a reference position in which calibration of the lidar unit 10 in the mounted state can be omitted based on the pre-calibration of the transmitter module 12 and the receiver module 14.

Furthermore, the mounting frame 16 comprises a number of mounting passthroughs 44 for attaching the lidar unit 10 to the vehicle. Mounting passthroughs 44 are designed to pass through pins, bolts, screws, clip connectors or other mounting devices to mount the lidar unit 10 on the vehicle.

REFERENCE CHARACTER LIST

10 Lidar unit
12 Transmitter module
14 Receiver module
16 Mounting element, Mounting frame
18 Device for the generation and deflection of a laser beam
20 Receiver
22 Frame
24 Insertion opening
26 First stop surface of the transmitter module 28 First stop surface of the mounting element
30 First edge area
32 Second stop surface of the receiver module
34 Second stop surface of the mounting element
36 Second edge area
38 Positioning receptacle, Positioning element
40 Positioning pin, Positioning element
42 Opening
44 Mounting passthrough

The invention claimed is:

1. A lidar unit for laser-based distance measurement for a vehicle, comprising:
   a transmitter configured to emit a laser beam;
   a receiver configured to receive a reflection of the emitted laser beam; and
   a mounting element for attaching the transmitter and the receiver, wherein the mounting element and the transmitter have corresponding first stop surfaces for alignment of the transmitter on the mounting element,
   wherein the mounting element and the receiver have corresponding second stop surfaces for alignment of the receiver on the mounting element,
   wherein the transmitter is pre-calibrated relative to its first stop surface, wherein the receiver is pre-calibrated relative to its second stop surface, and
   wherein the first stop surfaces and/or the second stop surfaces each have multiple corresponding surface areas, which are arranged at an angle to each other or in multiple parallel planes; and
   wherein the transmitter and receiver are integrally assembled using the first stop surface and the second stop surface to form a pre-calibrated lidar unit;
   wherein, the first stop surface and the second stop surface are implemented as substantially flat stop surfaces.

2. The lidar unit according to claim 1, wherein the first stop surfaces and/or the second stop surfaces are each implemented as essentially flat stop surfaces.

3. The lidar unit according to claim 2, wherein the first stop surface and the second stop surface of the mounting element essentially lie in a common plane.

4. The lidar unit according to claim 1, wherein the mounting element is implemented as a flat mounting frame, and the transmitter and the receiver are arranged on the mounting frame.

5. The lidar unit according to claim 4, wherein the mounting frame has a peripheral frame and an insertion opening for accepting the transmitter and/or the receiver.

6. The lidar unit according to claim 1, wherein the first stop surfaces and/or the second stop surfaces have corresponding positioning elements for alignment of the transmitter and/or the receiver on the mounting element.

7. The lidar unit according to claim 6, wherein the corresponding positioning elements of the first stop surfaces and/or the second stop surfaces have corresponding positioning pins and positioning receptacles.

8. The lidar unit according to claim 1, wherein the first stop surface of the transmitter is formed by first edge areas of the transmitter.

9. The lidar unit according to claim 1, wherein the second stop surface of the receiver is formed by second edge areas of the receiver.

10. The lidar unit according to claim 1, wherein the mounting element has a number of mounting passthroughs for attaching the lidar unit to the vehicle.

11. The lidar unit according to claim 1, wherein the lidar unit has fasteners for fastening the transmitter and/or the receiver.

12. A method for the assembly of a lidar unit for laser-based distance measurement for a vehicle, the method comprising:
   providing a transmitter configured to emit a laser beam;
   providing a receiver configured to receive a reflection of the emitted laser beam;
   providing a mounting element for attaching the transmitter and the receiver, integrally assembling the transmitter and receiver by:
   attachment of the transmitter to the mounting element, wherein corresponding first stop surfaces of the transmitter and the mounting element are brought into contact with each other; attaching the receiver to the mounting element, wherein corresponding second stop surfaces of the receiver and the mounting element are brought into contact with each other;
   pre-calibrating the transmitter in relation to the first stop surface; and
   pre-calibrating the receiver in relation to the second stop surface, wherein the first stop surfaces and/or the second stop surfaces each have multiple corresponding surface areas, which are arranged at an angle to each other or in multiple parallel planes;
   wherein the first stop surface and the second stop surface are implemented as substantially flat stop surfaces.

* * * * *